United States Patent [19]

Weiner et al.

[11] Patent Number: 5,415,009

[45] Date of Patent: * May 16, 1995

[54] CRYOGENIC REFRIGERATION SYSTEM WITH INSULATED FLOOR

[75] Inventors: Marvin H. Weiner, Glyndon, Md.; Michael A. Curtis, Yakima, Wash.

[73] Assignee: Cryo-Trans, Inc., Mt. Airy, Md.

[ * ] Notice: The portion of the term of this patent subsequent to Jun. 28, 2011 has been disclaimed.

[21] Appl. No.: 190,906

[22] Filed: Feb. 3, 1994

Related U.S. Application Data

[63] Continuation-in-part of Ser. No. 48,730, Apr. 21, 1993, Pat. No. 5,323,622.

[51] Int. Cl.⁶ .............................................. B60H 1/32
[52] U.S. Cl. ......................................... 62/239; 62/384
[58] Field of Search .................................. 62/239, 384

[56]           References Cited
          U.S. PATENT DOCUMENTS

| | | |
|---|---|---|
| 1,880,735 | 10/1932 | Bonine . |
| 1,975,177 | 10/1934 | Sherrick . |
| 2,011,881 | 8/1935 | Stewart . |
| 2,123,678 | 7/1938 | Hadden . |
| 2,160,993 | 6/1939 | Torburn . |
| 2,170,332 | 8/1939 | Justheim . |
| 2,190,796 | 2/1940 | Michalske . |
| 2,325,371 | 7/1943 | Clerc . |
| 2,731,807 | 1/1956 | Allyne . |
| 2,840,995 | 7/1958 | Hazard . |
| 3,100,971 | 8/1963 | Morrison . |
| 3,127,755 | 4/1964 | Hemery . |
| 3,206,946 | 11/1965 | Lindersmith et al. . |
| 3,241,329 | 3/1966 | Fritch, Jr. et al. . |
| 3,561,226 | 2/1971 | Rubin . |
| 3,783,633 | 1/1974 | Glynn et al. . |
| 3,864,936 | 2/1975 | Frank et al. . |
| 3,971,231 | 1/1976 | Derry . |
| 4,248,060 | 2/1981 | Franklin, Jr. . |
| 4,299,429 | 11/1981 | Franklin, Jr. . |
| 4,376,511 | 3/1983 | Franklin, Jr. . |
| 4,381,649 | 5/1983 | Franklin . |
| 4,404,818 | 9/1983 | Franklin, Jr. . |
| 4,457,142 | 7/1984 | Bucher . |
| 4,502,293 | 3/1985 | Franklin, Jr. . |
| 4,593,536 | 6/1986 | Fink et al. . |
| 4,704,876 | 11/1987 | Hill . |
| 4,761,969 | 8/1988 | Moe . |
| 4,766,732 | 8/1988 | Rubin . |
| 4,825,666 | 3/1989 | Saia, III . |
| 4,891,954 | 1/1990 | Thomsen . |
| 4,951,479 | 8/1990 | Araquistain et al. . |
| 4,991,402 | 2/1991 | Saia, III . |
| 5,074,126 | 12/1991 | Mahieu . |
| 5,125,237 | 6/1992 | Saia, III et al. . |
| 5,152,155 | 10/1992 | Shea et al. . |
| 5,168,717 | 12/1992 | Mowatt-Larssen . |

Primary Examiner—Ronald C. Capossela
Attorney, Agent, or Firm—Roylance, Abrams, Berdo & Goodman

[57] ABSTRACT

A cryogenic refrigeration system for a container is selectively operable to maintain its cargo in frozen and non-frozen conditions. The system includes a cargo compartment defined by a floor, a pair of opposed side walls, a pair of opposed end walls, and a lower ceiling. A roof is located above the lower ceiling. Upper and lower compartments or bunkers are provided between the lower ceiling and the roof, and are separated by a fixed, non-porous upper ceiling. A plurality of openings extend through the lower ceiling for fluid communication between the lower compartment and the cargo compartment. Upper and lower cryogenic snow-forming devices are provided in the upper and lower compartments, with each snow-forming device having a coupling connecting it to a supply of cryogenic liquid. Conduits or passages are located in the walls and floor to convey the cryogenic snow and gas from the upper compartment and through the walls and floor in a manner that isolates the cryogenic snow and gas from the cargo compartment. Thermal insulation extends between and separates the conduits in the floor from the cargo compartment.

24 Claims, 7 Drawing Sheets

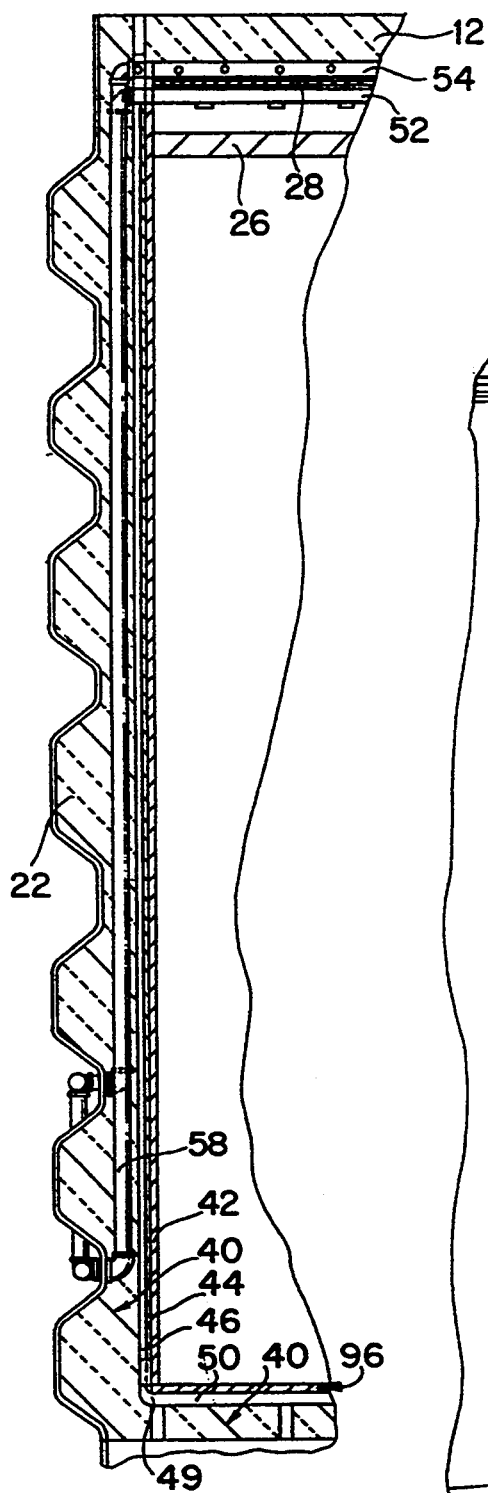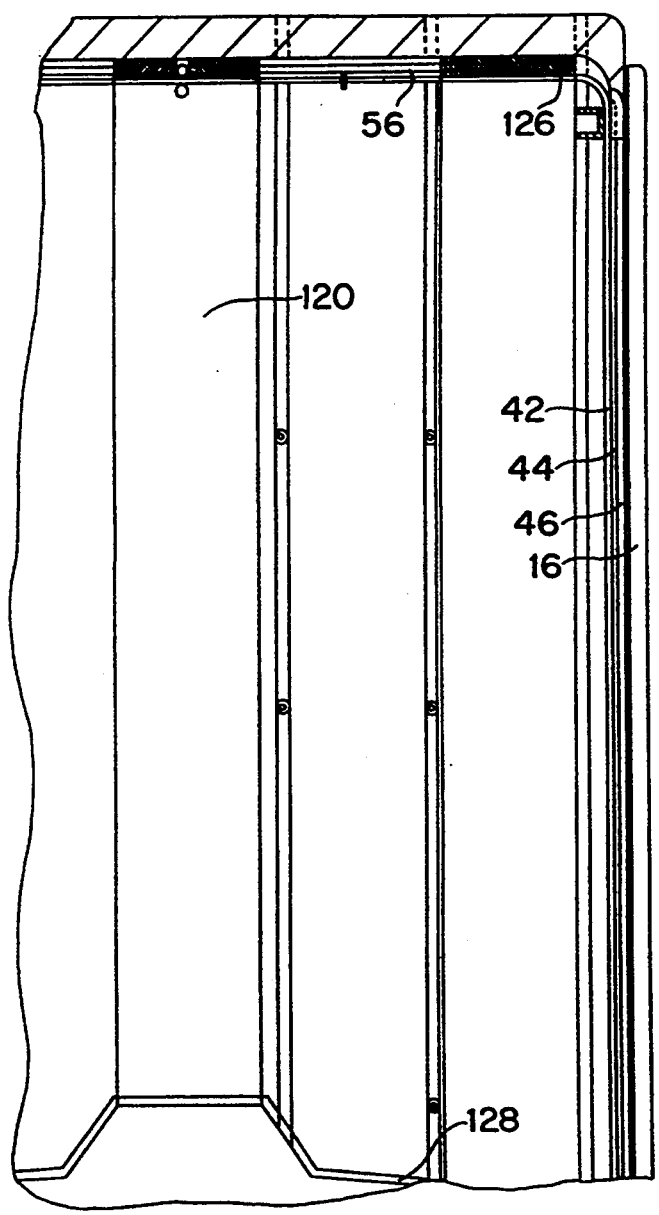
FIG. 4
FIG. 5

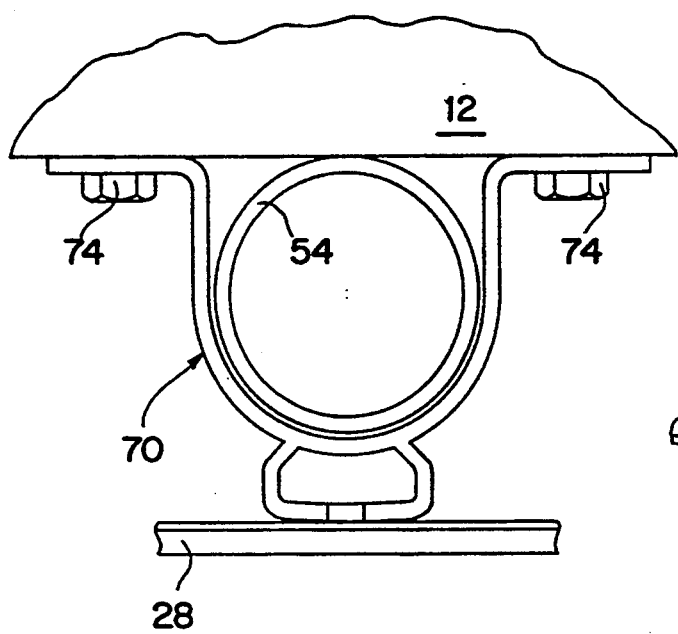
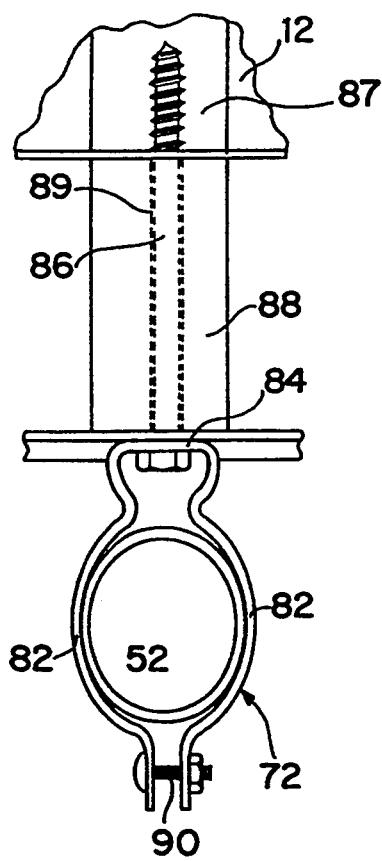
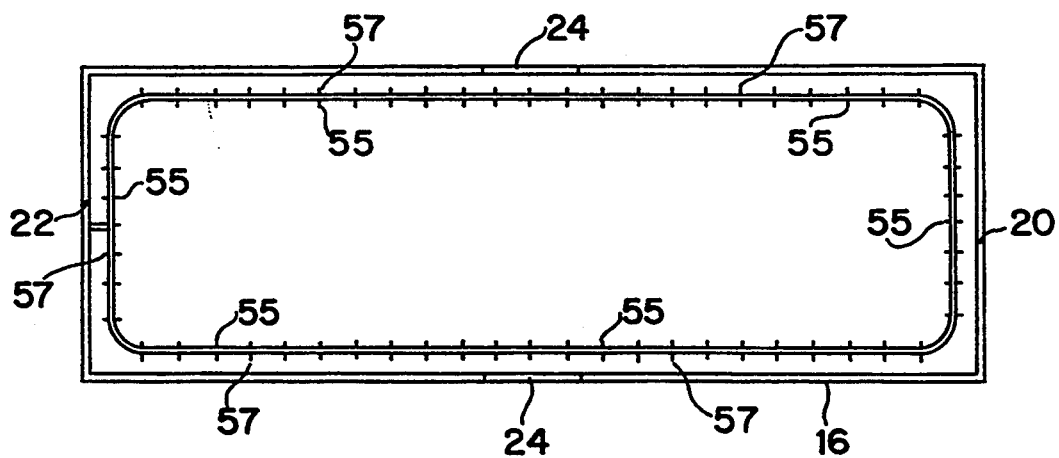

CRYOGENIC REFRIGERATION SYSTEM WITH INSULATED FLOOR

CROSS REFERENCE TO RELATED APPLICATION

This application is a continuation-in-part of U.S. patent application Ser. No. 08/048,730, of Weiner et al., entitled Cyrogenic Refrigeration System, filed Apr. 21, 1993, now U.S. Pat. No. 5,323,622, the subject matter of which is hereby incorporated by reference.

FIELD OF THE INVENTION

The present invention relates to a multi-temperature cryogenic refrigeration system for shipping and storing cargo. The system can be selectively operated to maintain the cargo at frozen and non-frozen temperatures. At non-frozen temperatures, the cryogenic gas is isolated from the cargo compartment to prevent the gas from contacting and damaging the goods. At frozen temperatures, the cryogenic gas enters the cargo compartment.

BACKGROUND OF THE INVENTION

Cryogenic refrigeration systems are replacing mechanical systems for transporting frozen cargo, particularly by railcar. A particularly effective system for transporting cargo at frozen temperatures is disclosed in U.S. Pat. No. 4,704,876 to Hill, the subject matter of which is hereby incorporated by reference. In the system of the Hill patent, the railcar walls are insulated, and a ceiling between the railcar roof and floor separates an upper refrigerant compartment or bunker from the lower cargo compartment. The ceiling of the cargo compartment or bunker floor is provided with openings. A distribution pipe coupled to a source of liquid carbon dioxide extends along the length of the upper bunker. The distribution pipe converts liquid carbon dioxide to carbon dioxide snow which is stored in the bunker. During transit, the carbon dioxide snow sublimates and the gas escapes through the openings in the bunker floor to pass into and to cool the cargo in the cargo compartment. The floor of the cargo compartment is provided with open top, lengthwise channels which receive the carbon dioxide and conduct it to one end of the car where it is discharged out an exterior vent in one end wall of the railcar.

The railcar according to the Hill patent has been successfully used for transporting frozen products which can be directly exposed to the carbon dioxide gas without adverse effects. However, such system cannot be used with products which cannot be frozen or cannot be exposed to direct contact with the carbon dioxide gas.

Cargo requiring refrigeration at non-frozen temperatures and sensitive to carbon dioxide gas is typically transported in mechanical refrigeration systems employing a circulating refrigerant and a power-driven compressor. Such mechanical systems are disadvantageous due to the need for extensive maintenance.

Carbon dioxide refrigeration systems have been proposed for non-frozen goods, as well as frozen goods. U.S. Pat. No. 4,761,969 discloses a carbon dioxide refrigeration system for storing both frozen and non-frozen goods. For frozen goods, liquid carbon dioxide is conveyed to an upper distribution pipe or manifold for depositing snow into a refrigerant compartment or bunker located above the cargo compartment. The bunker floor separates the refrigerant compartment from the cargo compartment and has openings to permit sublimating carbon dioxide gas to pass from the refrigerant compartment into the cargo compartment. For non-frozen goods, liquid carbon dioxide is conveyed to a lower manifold or distribution pipe located within an expandable bladder. The carbon dioxide gas generated in the bladder is vented directly to the outside of the container, and does not pass into the cargo compartment. The expandable bladder, when filled with carbon dioxide snow, acts as a cold plate to cool the load by convection. This system is disadvantageous in view of the need for an expandable bladder which will retain its resiliency, even when subjected to the extremely cold temperatures of the carbon dioxide snow and since inadequate cooling may be provided along the sides and bottom of the container.

Another dual purpose cryogenic system is disclosed in U.S. Pat. No. 5,152,155. This patent discloses a refrigerated railcar wherein carbon dioxide snow is formed and deposited on a bunker floor from a single distribution pipe located within the single refrigerant compartment in the railcar. For frozen goods, carbon dioxide gas is conveyed through serpentine ducts in the railcar walls and through openings in the bunker floor directly into the cargo compartment. For non-frozen goods, the openings in the bunker floor are closed by a switchable valve such that the flash gas and the sublimating carbon dioxide gas can only pass through the serpentine passages in the walls, isolating the carbon dioxide gas from the cargo. This system is disadvantageous due to the difficulty and potential problems in the mechanism for opening and closing the switchable valves in order to convert the railcar from a frozen mode to a non-frozen mode. Additionally, inadequate cooling may be provided in the walls and floor.

Further, the floor should be insulated and resistant to decay.

SUMMARY OF THE INVENTION

It has now been discovered that the disadvantages associated with conventional cryogenic refrigeration systems are eliminated by providing a refrigerant compartment separated from the cargo compartment by a non-porous, fixed upper ceiling. The refrigerant compartment is connected to conduits in the walls and floor such that the cryogenic gas and snow produced in the upper compartment is conveyed throughout the railcar or other container ceiling, walls and floor without passing through the cargo compartment and without contacting the cargo. The conduits in the floor are separated from the cargo compartment by thermal insulation.

The present invention comprises a multi-temperature cryogenic refrigeration system for a container which is operable to maintain cargo stored in the container at least in non-frozen conditions. The system comprises a cargo compartment defined by a floor, a pair of opposed side walls, a pair of opposed end walls, and a non-porous ceiling. A roof is positioned above the lower ceiling. A refrigerant compartment is between the ceiling and the roof. Cryogenic snow-forming means are provided in the refrigerant compartment, and has coupling means for connecting the snow-forming means to a supply of cryogenic liquid. Conduit means in the walls and floor convey cryogenic snow and gas from the upper compartment, through the walls and floor, in a manner isolating the cryogenic snow and gas from the cargo compartment. Thermal insulation extends between and separates the cargo compartment from the floor conduits.

By forming the refrigeration system in this manner, the system can be operated to maintain non-frozen temperatures by supplying cryogenic liquid to the snow-forming means to form cryogenic snow and gas in the refrigerant compartment, and convey cryogenic snow and gas through the conduit means to maintain refrigeration of the cargo, while isolating the cryogenic snow and gas from the cargo. The thermal insulation prevents excess cooling of cargo at the floor level.

Other objects and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 4 is a partial, side elevational view in section of the railcar of FIG. 1;

FIG. 5 is a partial, end elevational view of the inside of one end wall of the railcar of FIG. 1;

FIG. 8 is a plan view graphically illustrating the snow-forming pipes in the upper compartment of the railcar of FIG. 1; and FIGS. 9 and 10 are side elevational views of the snow-forming pipe supporting mechanisms.

DETAILED DESCRIPTION OF THE INVENTION

The illustrated embodiment of the present invention incorporates the multi-temperature cryogenic refrigeration system in a railcar 10. However, the invention can be incorporated in other vehicles such as trucks or trailers and in other containers such as modular shipping containers.

Figure 1:
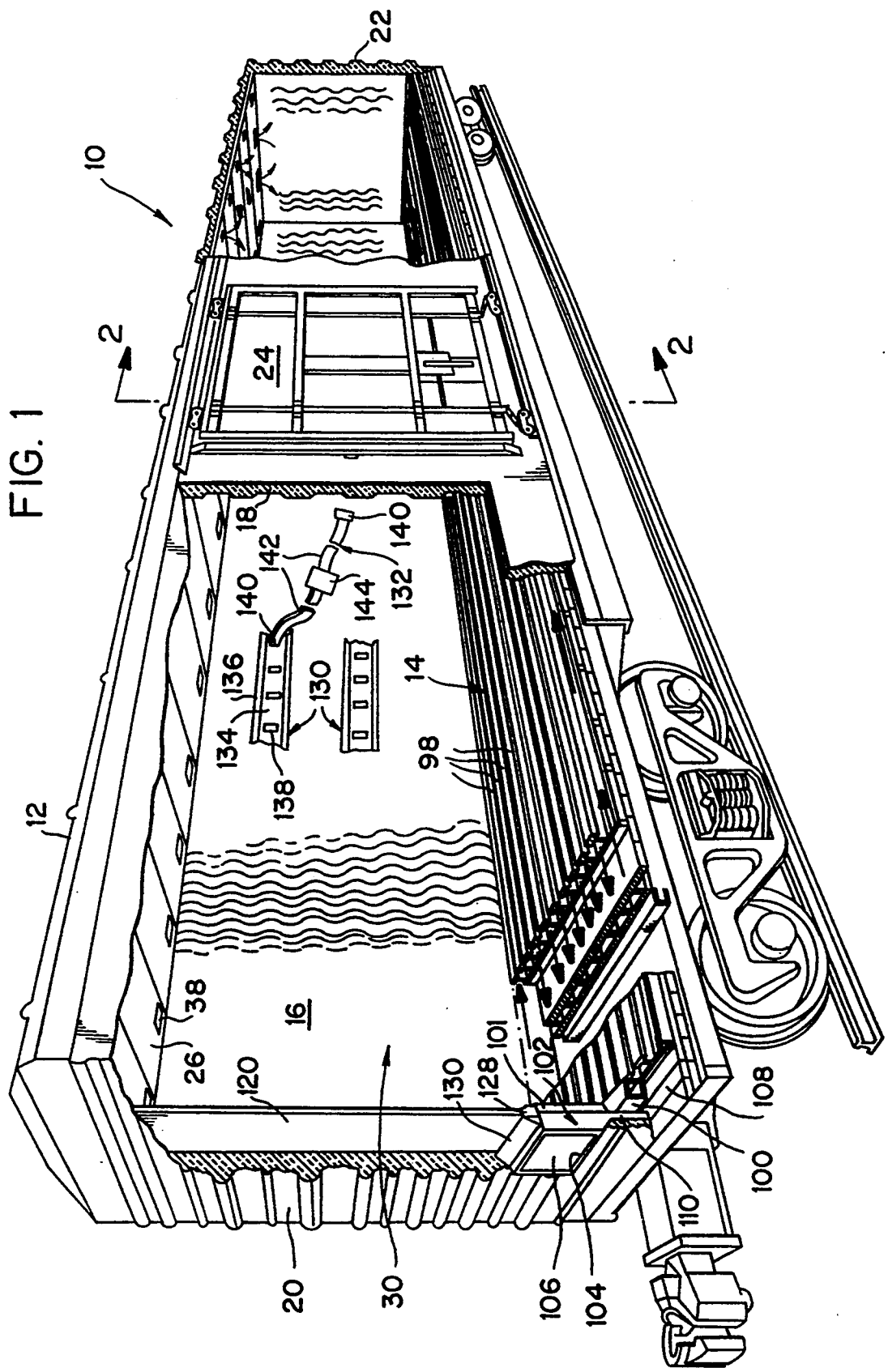
FIG. 1 is a perspective view of a multi-temperature cryogenically refrigerated railcar, with portions broken away, in accordance with the present invention.

Referring initially to FIG. 1, railcar 10 comprises an exterior roof 12, a floor 14, opposite side walls 16 and 18, and opposite end walls 20 and 22. The side walls, end walls, floor and roof define the body of the railcar and are insulated. Each of the side walls 16 and 18 is provided with a conventional insulated, plug-type sliding door 24.

Figure 2:
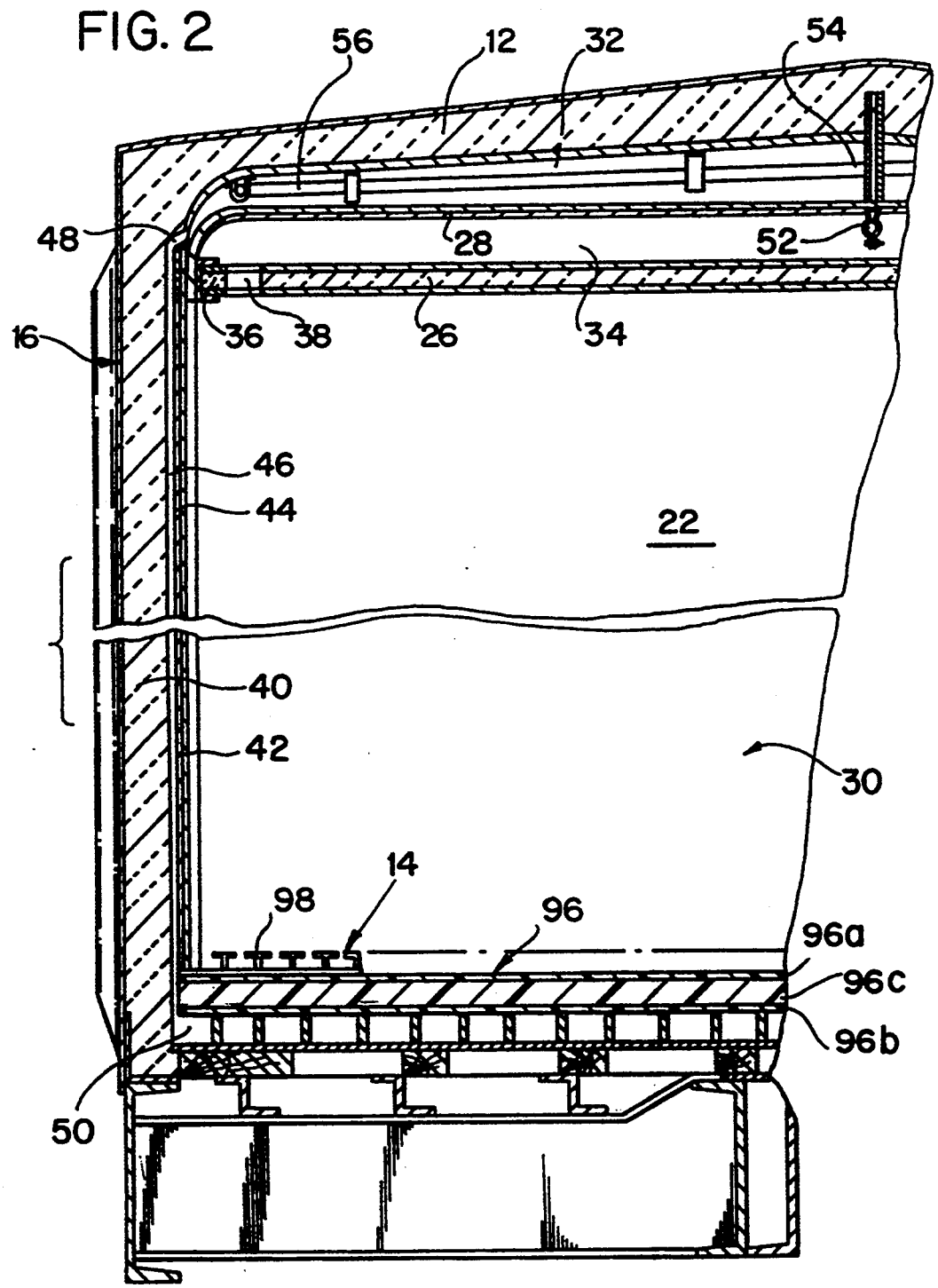
FIG. 2 is an enlarged, partial, side elevational view taken along line 2—2 of FIG. 1.

As best illustrated in FIG. 2, a lower fixed ceiling 26 is mounted in the railcar body substantially parallel to and between floor 14 and roof 12. An upper fixed ceiling 28 is mounted in the body substantially parallel to and between lower ceiling 26 and roof 12. Each of the ceilings is made up of a plurality of individual abutting panels extending across the entire length of the railcar. Each panel of the upper ceiling can be formed of a unitarily molded member or, separate sections which are attached together. The cargo compartment 30 of the railcar is defined between lower ceiling 26 and floor 14.

The refrigerant bunkers defined between roof 12 and lower ceiling 26 is divided into an upper compartment or bunker 32 and a lower compartment or bunker 34 by upper ceiling 28.

The panels forming lower ceiling 26 are supported by U-shaped brackets 36 mounted on the inner surfaces of the opposed side walls 16 and 18. A plurality of openings 38 extend completely through lower ceiling 26 to provide direct fluid communication between lower refrigerant compartment or bunker 34 and cargo compartment 30. Openings 38 are located throughout the lower ceiling, and preferably are located along the end and side walls and the center longitudinal axis of the railcar. The panels forming the lower ceiling are formed of fiberglass or other suitable insulating material.

Upper ceiling 28 is formed of non-porous panels having a sealed connection with and supported by brackets 36. The sealed connections of upper ceiling 28 seal upper compartment or bunker 32 from lower compartment 34 and cargo compartment 30 to prevent the flow of carbon dioxide gas therebetween. Preferably, the panels forming upper ceiling 28 are formed of molded plastic, preferably nonporous reinforced fiberglass and are entrapped at their edges between brackets 36 and the railcar side walls with bolts. The upper ceiling can be coated on its lower surface with an insulating foam.

Figure 3:
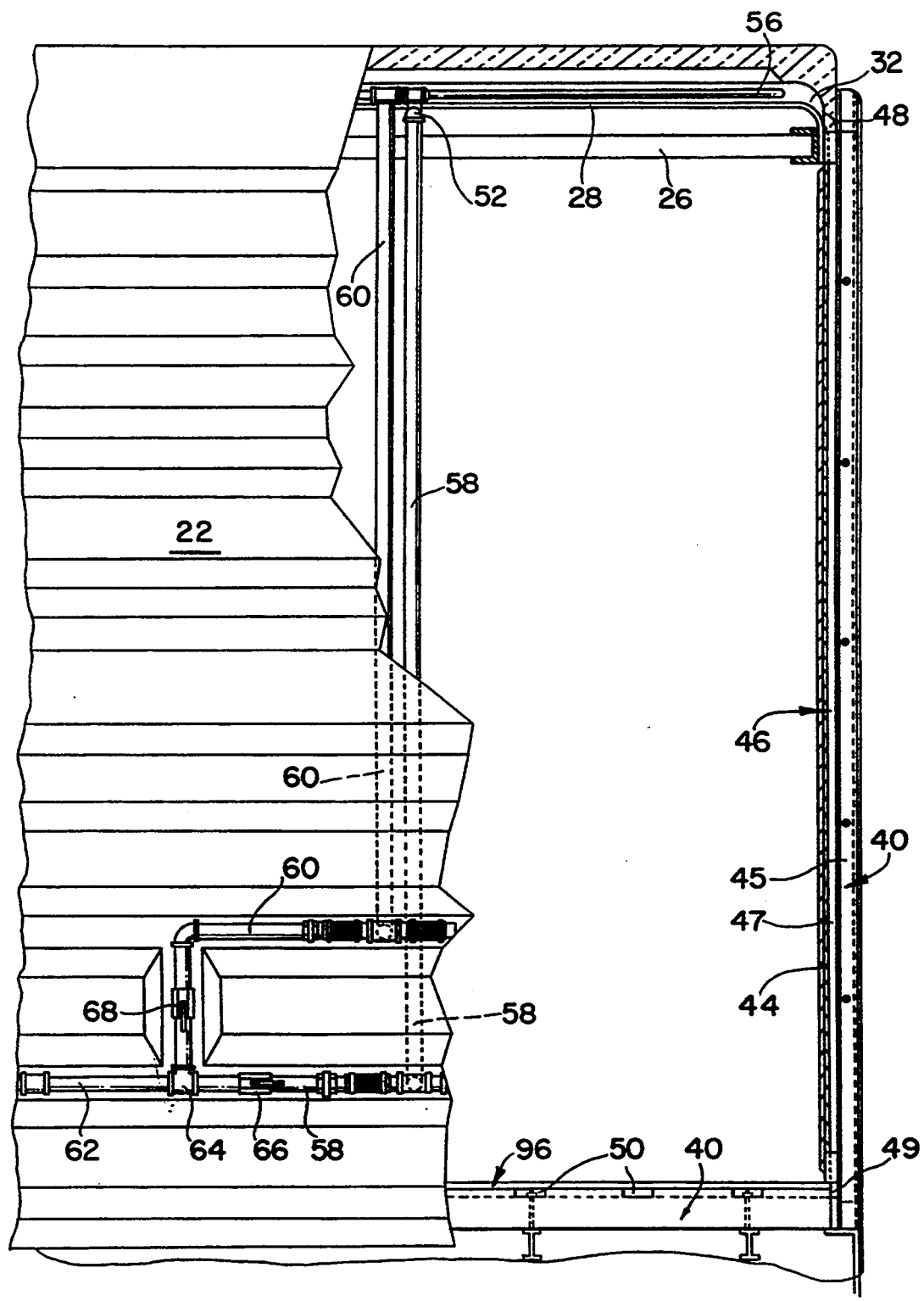
FIG. 3 is a partial, end elevational view of the railcar of FIG. 1, with parts broken away.

Each of the side walls, end walls and roof are provided with suitable insulation, preferably foam insulation 40. The interior surfaces of the end and side walls have fiberglass sheets 42 formed with sinusoidal grooves and backed by plywood. The backs or outer surfaces of fiberglass sheets 42 are backed by an insulation layer 44, which preferably is foam insulation. The outer skin of the side and end walls is supported by side posts 45 and wall stringers 47, as illustrated in FIG. 3. Voids or spaces are left between adjacent wall stringers and between insulation layer 44 and wall insulation 40 to provide hollow spaces 46 in each of the end walls and the side walls. Hollow spaces 46 extend substantially the entire height of the railcar from below the upper surface of floor 14 to upper compartment 32. A gas duct or passage 48 extending through the insulation connects the upper end of each hollow space to upper compartment 32 to provide direct fluid communication therebetween. The lower ends of the floor channels are in direct fluid communication, via gas ducts or passages 49 extending through the insulation, with longitudinally extending passages 50 extending through the floor 14. Hollow spaces 46 and floor passages 50, with ducts or passages 48 and 49, form conduits in the walls and floor which are separated and isolated from the cargo compartment 30.

Separate mechanisms are provided for forming carbon dioxide gas and snow from carbon dioxide liquid in each of upper compartment 32 and lower compartment 34. The snow-forming mechanism in lower compartment 34 comprises a distribution pipe 52 which extends centrally and substantially along the entire length of the railcar. Suitable nozzles 53 are provided along the entire length of distribution pipe 52 with nozzle openings 53a directed towards the side walls of the railcar (see FIG. 6).

The upper compartment 32 houses an upper distribution pipes 54 and 56 for forming carbon dioxide snow from liquid carbon dioxide. Pipes 54 and 56 are connected in a rectangular shape. Longitudinal distribution pipes 54 extend substantially the entire length of the railcar and are spaced toward the side walls from the central longitudinal axis of the railcar. The longitudinal ends of distribution pipes 54 are coupled to the two transverse distribution pipes 56. The transverse distribution pipes extend perpendicularly to distribution pipes 54, and are located proximate to the end walls 20 and 22. Typically, pipes 54 and 56 are spaced about one foot from the side or end wall closest thereto.

Each of distribution pipes 54 and 56, have spaced nozzles 55 and 57 generally along their entire lengths, as graphically illustrated in FIG. 8. Nozzles 55 with openings 55a are directed laterally inwardly toward the center of the railcar. Nozzles 57 are directed outwardly toward the respective side or end wall and are angled downwardly (see FIG. 6). As illustrated in FIG. 8, outwardly directed nozzles 57 on pipes 54 are omitted over side doors 24.

Distribution pipe 52 is connected to inlet line 58. Distribution pipes 54 and 56 are coupled to inlet line 60. Inlet lines 58 and 60 are connected to a common supply line 62 at junction 64. The flow of liquid through inlet line 58 is controlled by a valve 66, while the flow of liquid through inlet line 60 is controlled by a valve 68. Valves 66 and 68 are located downstream of junction 64. The end of supply line 62 remote from junction 64 is provided with a suitable coupling for attaching a conduit from a carbon dioxide or other cryogenic liquid source. Inlet lines 58 and 60 and supply line 62, as well as junction 64 and valves 66 and 68 as illustrated in the lower portion of FIG. 3, are extended and provided symmetrically as a mirror image of that shown in the opposite lateral direction shown (where portions of end wall 22 are broken away) to enable the cryogenic liquid conduit to be attached at either side wall of the railcar.

As best illustrated in FIGS. 9 and 10, distribution pipes 54 and 56 and distribution pipe 52 are supported by brackets 70 and 72, respectively. Each bracket 70 is generally U-shaped to receive and support distribution pipe 54 or 56. The upper, free ends of each bracket 70 are attached to roof 12 by bolts 74.

Each bracket 72 is generally U-shaped for trapping lower distribution pipe 52 between the legs 82 thereof. The bight portion 84 of each bracket 72 is attached by a fastener 86 to a reinforcement 87 in roof 12. A spacer 88, with a bore 89 receiving fastener 86, is provided about fastener 86 to abut ceiling 28 and roof 12 and to entrap and support ceiling 28 between spacer 88 and bracket bight 84. A bolt 90 secures the lower ends of legs 82 to tightly entrap distribution pipe 52.

Floor 14 comprises a thermal insulation decking layer 96. A plurality of channel elements 98 extend longitudinally across the upper surface of the decking. These channel elements are the same as those described in the above-cited patent to Hill, or can be conventional hat shaped channels and thus, are not described in detail.

Below decking layer 96 are the longitudinally extending floor passages 50 in floor 14. These passages are separated and insulated from the cargo compartment and are sealed from the cargo compartment by decking layer 96. Decking layer 96 comprises a composite of two non-porous plastic sheets 96a and 96b with an insulating layer 96c therebetween. The sheets 96a and 96b are preferably polypropylene, e.g., Azdel, to provide strength and resistance to decay, particularly from moisture.

Figure 7:
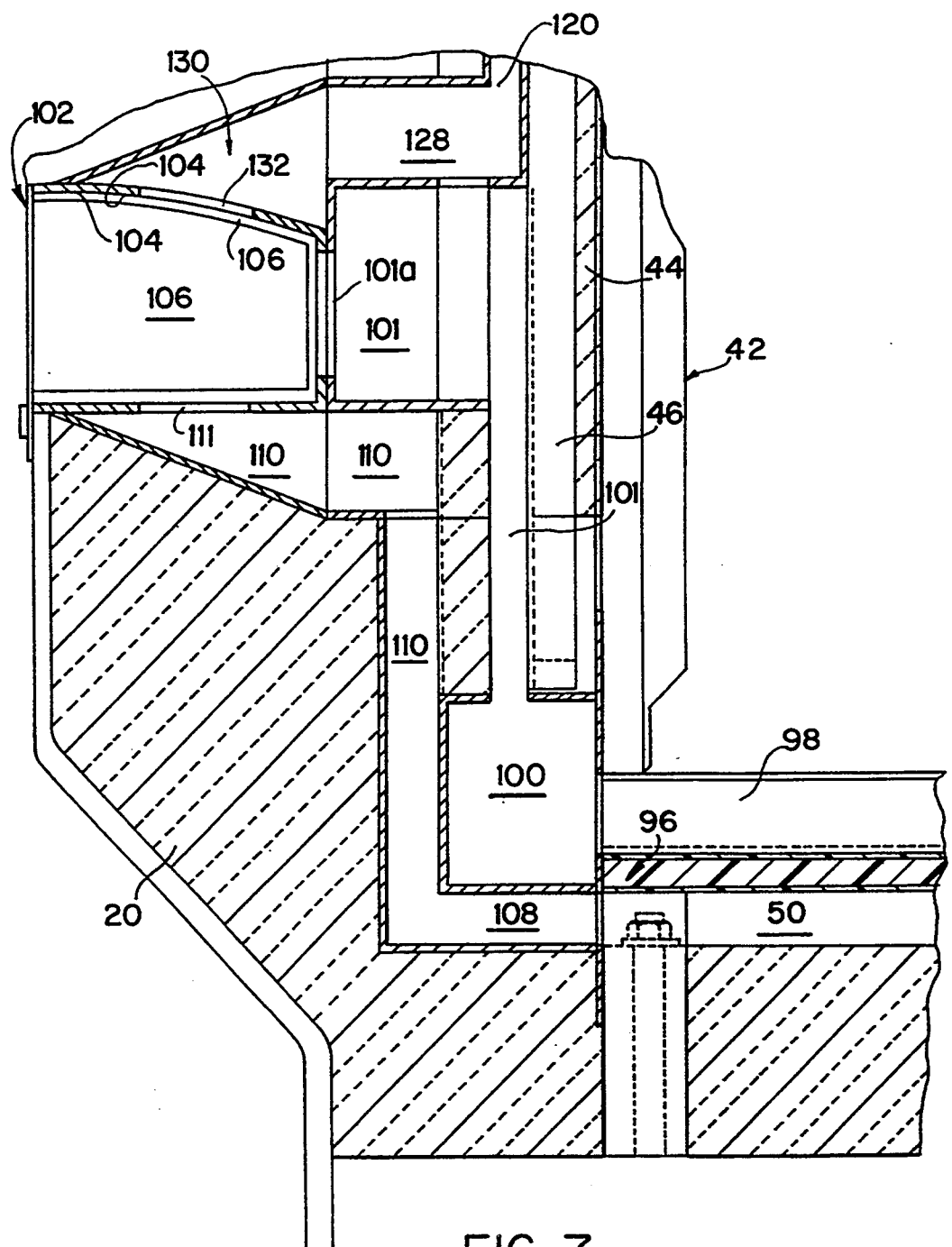
FIG. 7 is a partial, side elevational view, in section, of the exhaust vent arrangement of the railcar of FIG. 1.

The conduit provided by the channel elements 98 terminates in a plenum 100 located adjacent end wall 20. Flow of gas through channel elements 98 passes into plenum 100, and then through passages 101 and opening 101a into an exhaust vent 102 formed in end wall 20 (see FIGS. 1 and 7). The opening 104 in exhaust vent 102 can be selectively opened and closed by a door 106 which can be fastened shut. When the door 106 is opened, venting of the carbon dioxide gases to the outside is facilitated, and is particularly necessary when initially charging the bunkers with carbon dioxide. Exhaust vent 102 is located at the level of floor 14.

The outer surface 106a of door 106 and the mating surface 104a of opening 104 are covered with a flexible polymer foam. This foam provides a tight seal between door 106 and opening 104.

Floor passages 50 terminate in a plenum 108. Plenum 108 is likewise connected to the exhaust vent 102 through passages 110 and opening 111 for venting carbon dioxide gas.

Figure 6:
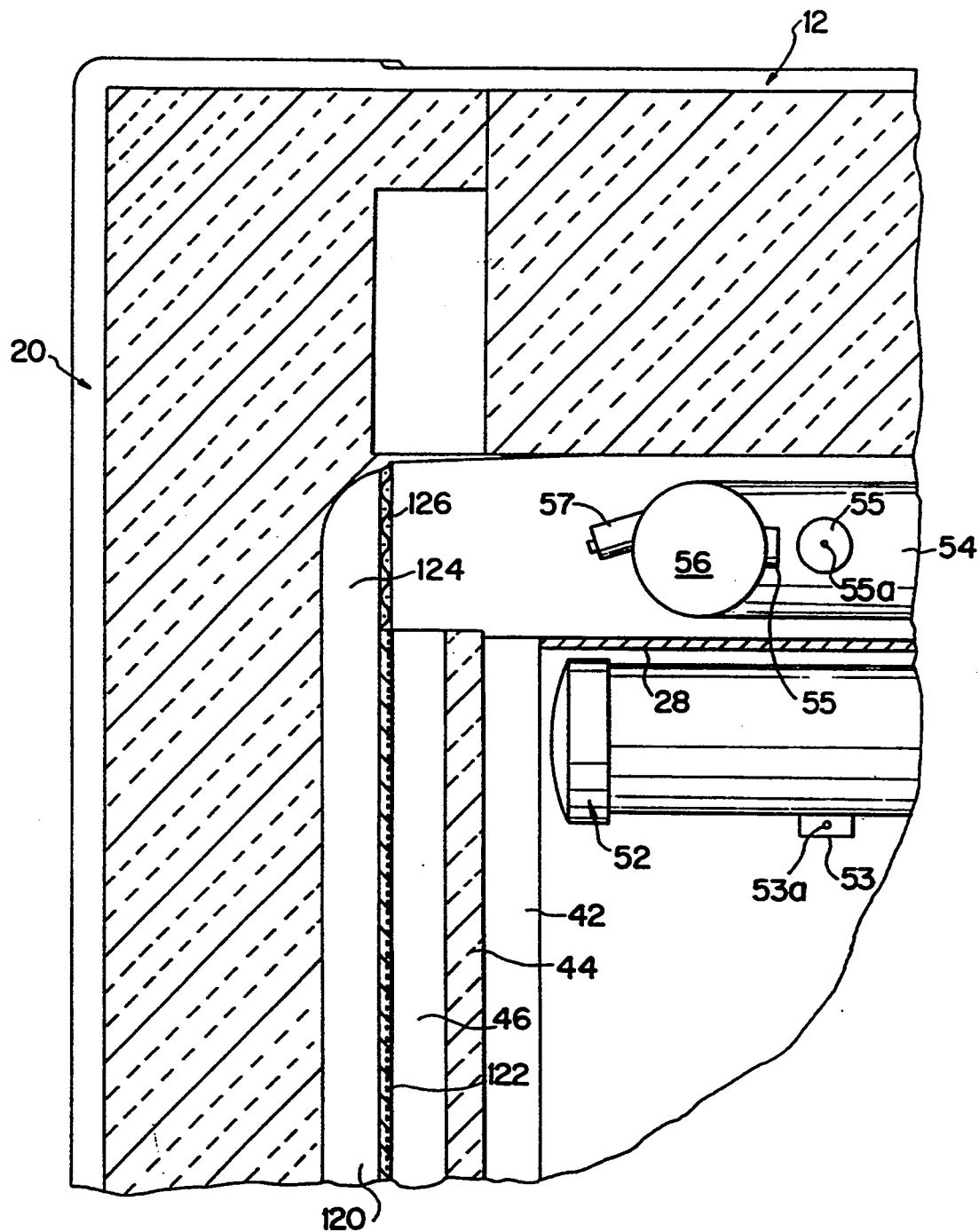
FIG. 6 is a partial, side elevational view, in section, illustrating one upper end of the railcar of FIG. 1.

As illustrated in FIGS. 5 and 6, end wall 20 has a plurality of vertically arranged, laterally spaced vent chambers 120 for relieving flash gas pressure during charging with cryogenic liquid through upper distribution pipes 54 and 56. Each vent chamber 120 is defined by a fiberglass divider 122, separating the vent chambers from hollow spaces 46 in end wall 20. The upper ends 124 of vent chamber 120 open into upper compartment or bunker 32 through a vent screen 126 such that mainly only excess gas, not snow will enter the vent chamber, as snow and gas are conveyed through the wall and floor conduits during the charging operation.

The lower end of each vent chamber 120 opens into a vent plenum 128 connected through a passage 130 and an openings 132 to exhaust vent 102. Door 106 overlies and closes opening 111 and 132 in its closed position. When door 106 is opened, gas can be vented to the outside through exhaust vent 102.

To assist in retaining the load in place in cargo compartment 30, pairs of brackets 130 are mounted on the inner surfaces of railcar side walls 16 and 18 for attaching straps 132 across the width of the railcar. Each bracket 130 has a base 134 spaced from the side wall inner surface by offset edge portions 136. A series of apertures 138 extend through each bracket base. Each strap 132 comprises a buckle 140 on each of the two opposite ends of flexible strips 142 connected by a tightening mechanism 144. The buckles of each strap are secured in selected apertures in the brackets mounted on the side walls opposite each other. Mechanism 144 is then operated to tighten the strap to the appropriate degree. The brackets can be alternatively arranged vertically to permit varying the vertical positioning of the straps.

In operation, railcar 10 can be selected to operate either in a frozen or non-frozen mode of operation. The mode of operation is selected by actuating valves 66 and 68. For frozen cargo, valve 66 is opened and valve 68 is closed to direct the cryogenic liquid through inlet line 58 to distribution pipe 52. For non-frozen products, valve 68 is opened and valve 66 is closed to direct the cryogenic liquid through inlet line 60 to distribution pipes 54 and 56.

The operation for the frozen mode is similar to that described in the above-cited Hill patent. When the railcar is charged with the liquid carbon dioxide, door 106 is opened. The liquid carbon dioxide passing through distribution pipe 52 exits the distribution pipe nozzles and turns into carbon dioxide gas and carbon dioxide snow. The carbon dioxide snow accumulates on the upper surface of lower ceiling 26. The flash gas generated during the snow formation in lower compartment 34 passes out through openings 38, down through the sinuous channels in fiberglass sheets 42 and through the spaces in the cargo, into the floor channels. From the floor channels, the gas passes into plenum 100 and out exhaust vent 102. After a desired amount of snow is accumulated in lower compartment 34, the supply of carbon dioxide liquid is terminated. After door 106 is moved to its closed position to close vent 102, the railcar is ready for transport. During transport, the carbon dioxide snow in compartment 34 sublimates. The sublimated gas passes down through openings 38 and into the cargo compartment to maintain the freezing temperature within cargo compartment 30. Upper compartment 32 provides an insulating air space in the frozen operational mode.

For the non-frozen operational mode, the liquid carbon dioxide passes into distribution pipes 54 and 56, and door 106 is opened. As the liquid carbon dioxide exits the distribution pipe nozzles, it forms carbon dioxide snow and flash gas in upper compartment 32 directed into the upper compartment by nozzles 55 and into the walls and floor by nozzles 57. The carbon dioxide snow and flash gas are also conveyed into hollow spaces 46 in the end and side walls and in the floor. In this manner, carbon dioxide snow will accumulate both in upper compartment 32 and in the hollow spaces in the walls and in the floor. Excess flash gas generated in the upper compartment is vented directly to exhaust vent 102 through vent chambers 120. Insulation layers 44 prevent freezing of cargo in contact with the inner surfaces of the side and end walls defined by fiberglass sheets 42. The flash gas and snow will continue into the passages 50 in floor 14 to plenum 108 and out exhaust vent 102. After charging, door 106 is closed. The railcar is then ready to transport non-frozen, perishable cargo. During transport, snow accumulated in upper compartment 32 and in hollow spaces 46 in the end and side walls and in the floor will insulate the load and maintain the appropriate load temperature.

Additionally, the railcar can be prechilled by briefly supplying cryogenic liquid to lower distribution pipe 52 and allowing the cryogenic gas to vent before operating the railcar in the non-frozen operational mode. For extra cooling both the frozen and non-frozen operational modes can be operated.

Although the invention has been described in considerable detail with particular reference to a certain preferred embodiment thereof, variations and modifications can be effected within the spirit and scope of the invention as defined in the appended claims.

What is claimed is:

1. A multi-temperature cryogenic refrigeration system for a container selectively operable to maintain cargo stored in the container, in frozen and non-frozen conditions, comprising:
    a cargo compartment defined by a floor, a pair of opposed side walls, a pair of opposed end walls, and a lower ceiling;
    a roof above said lower ceiling;
    upper and lower compartments between said lower ceiling and said roof and separated by a fixed upper ceiling, said upper ceiling being non-porous;
    a plurality of openings in said lower ceiling to permit fluid communication between said lower compartment and said cargo compartment;
    upper and lower cryogenic snow-forming means in said upper and lower compartments, respectively, each of said snow-forming means having coupling means for connecting the respective snow-forming means to a supply of cryogenic liquid;
    wall conduit means in said walls and floor conduit means in said floor for conveying cryogenic snow and gas from said upper compartment and through said walls and floor and for isolating the cryogenic snow and gas from said cargo compartment; and
    thermal insulation extending between and separating said cargo compartment from said floor conduit means.

2. A cyrogenic refrigeration system according to claim 1 wherein
    said thermal insulation is formed of plastic.

3. A cyrogenic refrigeration system according to claim 1 wherein
    said thermal insulation comprises a composite of two non-porous plastic sheets with an insulating layer therebetween.

4. A cyrogenic refrigeration system according to claim 3 wherein
    said sheets are formed of polypropylene.

5. A cyrogenic refrigeration system according to claim 1 wherein
    said floor comprises an upper layer of channel elements with passages opening upwardly into said cargo compartment; and
    said thermal insulation underlies said channel elements.

6. A multi-temperature cryogenic refrigeration system according to claim 1 wherein said wall conduit means comprises vertically extending passages in each of said walls connected at upper ends thereof to said upper compartment.

7. A multi-temperature cryogenic refrigeration system according to claim 6 wherein said vertically extending passages are separated from said cargo compartment by insulation.

8. A multi-temperature cryogenic refrigeration system according to claim 6 wherein said floor conduit means comprises longitudinally extending passages spaced across said floor connected to lower ends of said vertically extending passages.

9. A railcar with a multi-temperature cryogenic refrigeration system selectively operable to maintain cargo therein at frozen and non-frozen temperatures, comprising:
    a body defined by opposed side walls, opposed end walls, an roof and an floor;
    upper and lower fixed ceilings mounted in said body substantially parallel to and between said floor and said roof to define an upper compartment between said roof and upper ceiling, a lower compartment between said upper and lower ceilings and a cargo compartment between said lower ceiling and floor, said upper ceiling being non-porous and sealed to said walls, said lower ceiling having a plurality of openings extending therethrough;
    upper and lower cryogenic snow-forming means in said upper and lower compartments, respectively, each of said snow-forming means having coupling means for connecting the respective snow-forming means to a supply of cryogenic liquid;
    wall conduit means in said walls and floor conduit means in said floor for conveying cryogenic snow and gas from said upper compartment and through said walls and floor and for isolating the cryogenic snow and gas from said cargo compartment; and thermal insulation extending between and separating said cargo compartment from said floor conduits means;

whereby, for non-frozen temperatures cryogenic liquid is supplied only to said upper cryogenic snow-forming means to form cryogenic snow and gas in said upper compartment and convey cryogenic snow and gas through said conduit means, maintaining refrigeration of the cargo while isolating the cryogenic snow and gas from the cargo, and for frozen temperatures cryogenic liquid is supplied to said lower cryogenic snow-forming means to form cryogenic gas and snow in said lower compartment and allow cryogenic gas to pass through said openings in said lower ceiling and into said cargo compartment.

10. A railcar according to claim 9 wherein said wall conduit means comprises vertically extending passages in each of said walls connected at upper ends thereof to said upper compartment.

11. A railcar according to claim 10 wherein said vertically extending passages are separated from said cargo compartment by insulation.

12. A railcar according to claim 10 wherein said floor conduit means comprises longitudinally extending passages spaced across said floor connected to lower ends of said vertically extending passages.

13. A railcar according to claim 9 wherein
said thermal insulation is formed of plastic.

14. A railcar according to claim 9 wherein
said thermal insulation comprises a composite of two non-porous plastic sheets with an insulating layer therebetween.

15. A railcar according to claim 14 wherein
said sheets are formed of polypropylene.

16. A railcar according to claim 9 wherein
said floor comprises an upper layer of channel elements with passages opening upwardly into said cargo compartment; and
said thermal insulation underlies said channel elements.

17. A cryogenic refrigeration system for a container operable to maintain cargo stored in the container in a cooled, non-frozen condition, comprising:
a cargo compartment defined by a floor, a pair of opposed side walls, a pair of opposed end walls, and a fixed, non-porous ceiling;
a roof above said ceiling;
a refrigerant compartment between said ceiling and said roof;
wall conduit means in said walls and floor conduit means in said floor for conveying cryogenic snow and gas from said refrigerant compartment and through said walls and floor and for isolating the cryogenic snow and gas from said cargo compartment;
thermal insulation extending between and separating said cargo compartment from said floor conduit means; and
cyrogenic snow-forming means in said refrigerant compartment for forming cryogenic snow and gas in said refrigerant compartment and for directing the cryogenic snow and gas into said conduit means, said snow-forming means having coupling means for connecting said snow-forming means to a supply of cryogenic liquid.

18. A cryogenic refrigeration system according to claim 17 wherein said wall conduit means comprises vertically extending passages in each of said walls connected at upper ends therof to said upper compartment.

19. A cryogenic refrigeration system according to claim 18 wherein said vertically extending passages are separated from said cargo compartment by insulation.

20. A cryogenic refrigeration system according to claim 18 wherein said floor conduit means comprises longitudinally extending passages spaced across said floor connected to lower ends of said vertically extending passages.

21. A cyrogenic refrigeration system according to claim 17 wherein
said thermal insulation is formed of plastic.

22. A cryogenic refrigeration system according to claim 17 wherein
said thermal insulation comprises a composite of two non-porous plastic sheets with an insulating layer therebetween.

23. A cryogenic refrigeration system according to claim 22 wherein
said sheets are formed of polypropylene.

24. A cryogenic refrigeration system according to claim 17 wherein
said floor comprises an upper layer of channel elements with passages opening upwardly into said cargo compartment; and
said thermal insulation underlies said channel elements.

* * * * *